(12) United States Patent  (10) Patent No.: US 9,000,735 B2
Huang  (45) Date of Patent: Apr. 7, 2015

(54) DC-DC CONTROLLER AND OPERATION METHOD THEREOF

(75) Inventor: Hua-Chiang Huang, Taoyuan County (TW)

(73) Assignee: uPI Semiconductor Corp., Hsinchu County (TW)

( * ) Notice: Subject to any disclaimer, the term of this patent is extended or adjusted under 35 U.S.C. 154(b) by 245 days.

(21) Appl. No.: 13/615,607

(22) Filed: Sep. 14, 2012

(65) Prior Publication Data

US 2013/0335046 A1 Dec. 19, 2013

(30) Foreign Application Priority Data

Jun. 14, 2012 (TW) .............................. 101121364 A (51) Int. Cl.
*G05F 1/652* (2006.01)
*H02M 3/156* (2006.01)

(52) U.S. Cl.
CPC ...... *H02M 3/156* (2013.01); *H02M 2003/1566* (2013.01)

(58) Field of Classification Search
USPC ................ 323/222, 224, 234, 271, 273, 275, 323/282–288; 363/16, 17, 21.04, 21.12, 363/21.17, 49, 56.01, 65, 95, 98
See application file for complete search history.

(56) References Cited

U.S. PATENT DOCUMENTS

| 5,982,160 A * | 11/1999 | Walters et al. ................ 323/282 |
| 6,504,423 B2 * | 1/2003 | Riggio et al. ................. 327/560 |
| 6,825,642 B2 | 11/2004 | Brooks |
| 6,879,138 B2 | 4/2005 | Dinh et al. |
| 6,944,034 B1 * | 9/2005 | Shteynberg et al. ....... 363/21.13 |
| 7,180,274 B2 * | 2/2007 | Chen et al. .................... 323/222 |
| 7,570,032 B2 | 8/2009 | Mariani et al. |
| 7,885,088 B2 | 2/2011 | Zambetti et al. |
| 8,018,210 B2 * | 9/2011 | Chen et al. ................... 323/224 |
| 8,558,483 B2 * | 10/2013 | Lee et al. ..................... 315/307 |
| 2009/0128110 A1 | 5/2009 | DeLurio et al. |
| 2011/0204860 A1 | 8/2011 | Thiele et al. |
| 2012/0104967 A1 | 5/2012 | Lee et al. |

FOREIGN PATENT DOCUMENTS

| TW | 201106597 | 2/2011 |
| TW | 201120604 | 6/2011 |

OTHER PUBLICATIONS

"Office Action of Taiwan Counterpart Application", issued on Aug. 19, 2014, p. 1-p. 6.

* cited by examiner

*Primary Examiner* — Rajnikant Patel
(74) *Attorney, Agent, or Firm* — Jianq Chyun IP Office (57) ABSTRACT

A DC-DC controller and an operation method thereof are provided. The DC-DC controller is configured to connect an output stage. The DC-DC controller includes a pulse width modulation (PWM) calculation circuit, a load transient detection circuit, and an override time calculation circuit. The PWM calculation circuit provides a PWM signal to the output stage. The load transient detection circuit receives an input signal related to an output voltage of the output stage. The load transient detection circuit provides a control signal according to the input signal and a predetermined input signal. The override time calculation circuit provides an override control signal with a predetermined time to the PWM calculation circuit according to the control signal. The PWM calculation circuit adjusts a duty cycle of the PWM signal according to the override control signal.

12 Claims, 7 Drawing Sheets

FIG. 6

DC-DC CONTROLLER AND OPERATION METHOD THEREOF

CROSS-REFERENCE TO RELATED APPLICATION

This application claims the priority benefit of Taiwan application serial no. 101121364, filed on Jun. 14, 2012. The entirety of the above-mentioned patent application is hereby incorporated by reference herein and made a part of this specification.

BACKGROUND

1. Technical Field

The invention relates to a power control technique with pulse width modulation. Particularly, the invention relates to a direct current (DC)-DC controller capable of flexibly adjusting a pulse width and an operation method thereof.

2. Related Art

In the past, the semiconductor industry uses various methods and structures to form a power supply with pulse width modulation. Generally, regardless of a light load or a heavy load, a voltage output by the power supply is hopefully maintained to a fixed regulated voltage. However, in case of the heavy load, when a load current is increased, the output voltage may suddenly drops. Now, the power supply requires to control output capability of a direct current (DC)-DC converter, so as to quickly provide more energy.

Generally, regarding a transient response, a transient response signal of a tiny time is provided. However, the energy of the transient response signal is not great enough, which is of no avail for maintaining the output voltage of the power supply to the fixed regulated voltage.

SUMMARY

Accordingly, the invention is directed to a direct current (DC)-DC controller and an operation method thereof to resolve the problem mentioned in the related art.

The invention provides a DC-DC controller, which is configured to connect an output stage. The DC-DC controller includes a pulse width modulation (PWM) calculation circuit, a load transient detection circuit, and an override time calculation circuit. The PWM calculation circuit provides a PWM signal to the output stage. The load transient detection circuit receives an input signal related to an output voltage of the output stage. The load transient detection circuit provides a control signal according to the input signal and a predetermined input signal. The override time calculation circuit is coupled to the load transient detection circuit and the PWM calculation circuit, and provides an override control signal with a predetermined time to the PWM calculation circuit according to the control signal. The PWM calculation circuit adjusts a duty cycle of the PWM signal according to the override control signal.

In an embodiment of the invention, when the input signal received by the load transient detection circuit is an error amplification signal, the predetermined input signal is a triangle-wave signal.

In an embodiment of the invention, when the input signal is a feedback signal of the output stage, the predetermined input signal is a predetermined reference voltage.

In an embodiment of the invention, the load transient detection circuit includes a first comparator. The first comparator has a first input terminal, a second input terminal and a first output terminal. The first input terminal receives an error amplification signal, the second input terminal receives a triangle-wave top value signal, and the first output terminal outputs the control signal.

In an embodiment of the invention, the load transient detection circuit includes a second comparator, the second comparator has a third input terminal, a fourth input terminal and a second output terminal. The third input terminal receives a predetermined reference voltage, the fourth input terminal receives a sum signal of the input signal and an offset voltage, and the second output terminal outputs the control signal.

In an embodiment of the invention, the override time calculation circuit includes a first current source and a capacitor. The capacitor is coupled between an output of the first current source and a ground voltage terminal.

In an embodiment of the invention, the override time calculation circuit further includes a second current source, a third comparator, a first transistor and a first resistor. The second current source and the first current source form a current mirror. The third capacitor has a fifth input terminal, a sixth input terminal and a third output terminal, where the fifth input terminal receives a first reference voltage. A control terminal of the first transistor is coupled to the third output terminal, and a first terminal of the first transistor is coupled to an output of the second current source. One end of the first resistor is coupled to the sixth input terminal and a second terminal of the first transistor, and another end of the first resistor is coupled to the ground voltage terminal.

In an embodiment of the invention, the override time calculation circuit further includes a fourth comparator, a second transistor and a flip-flop. The fourth comparator has a seventh input terminal, an eighth input terminal and a fourth output terminal. The seventh input terminal is coupled to an output of the first current source, and the eighth input terminal receives a second reference voltage. A first terminal of the second transistor is coupled to the output of the first current source and the seventh input terminal, and a second terminal of the second transistor is coupled to the ground voltage terminal. The flip-flop has a ninth input terminal, a clock input terminal, a reset terminal, a fifth output terminal and a sixth output terminal, where an output of the fifth output terminal and an output of the sixth output terminal are inverted to each other, the ninth input terminal receives an operating voltage, the clock input terminal receives the control signal, the reset terminal is coupled to the fourth output terminal, the fifth output terminal outputs the override control signal, and the sixth output terminal is coupled to a control terminal of the second transistor.

In an embodiment of the invention, the PWM calculation circuit includes a fifth comparator, a compensation unit, a sixth comparator and a calculation and driving circuit. The fifth comparator has a tenth input terminal, an eleventh input terminal and a seventh output terminal, where the tenth input terminal receives a third reference voltage, and the eleventh input terminal receives a feedback signal. The compensation unit is coupled to the seventh output terminal and the ground voltage terminal. The sixth comparator has a twelfth input terminal, a thirteenth input terminal and an eighth output terminal, where the twelfth input terminal receives a triangle-wave signal, and the thirteenth input terminal is coupled to the seventh output terminal and the compensation unit. The calculation and driving circuit is coupled to the eighth output terminal, and receives the control signal to output the PWM signal to the output stage.

According to another aspect, the invention provides an operation method of a DC-DC controller, which includes following steps. An input signal related to an output voltage of an output stage is received. An override control signal with a predetermined time is provided according to a predetermined input signal and the input signal. A pulse width modulation (PWM) signal is provided according to the input signal and the override control signal, where the PWM signal is provided according to a feedback signal related to the output voltage in case of a normal load situation, and a duty cycle of the PWM signal is adjusted according to the override control signal when a load transient event occurs. The PWM signal is used to control DC-DC conversion of the output stage.

In an embodiment of the invention, when the input signal is an error amplification signal, the predetermined input signal is a triangle-wave top value signal.

In an embodiment of the invention, when the input signal is related to the feedback signal, the predetermined input signal is a predetermined reference voltage.

According to the above descriptions, in the invention, the PWM signal is provided according to the feedback signal through a circuit capable of detecting a load transient variation in case of a normal load situation, and the duty cycle of the PWM signal is adjusted according to the override control signal when a load transient event occurs, by which a desired value of the output voltage is effectively adjusted, which avails improving performance of the DC-DC controller.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
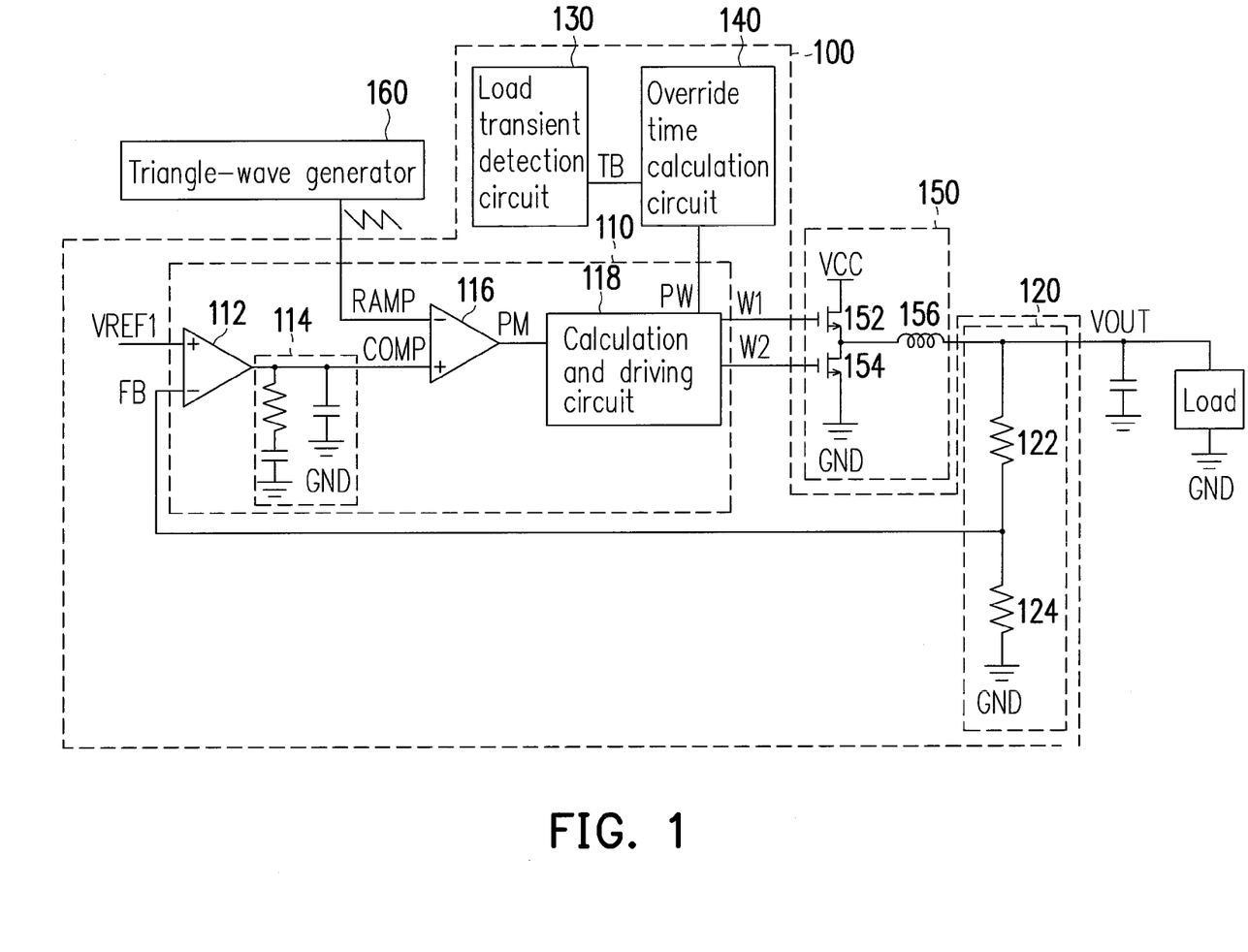
FIG. 1 is a circuit diagram of a direct current (DC)-DC converter according to an embodiment of the invention.

FIG. 1 is a circuit diagram of a direct current (DC)-DC converter according to an embodiment of the invention.

Referring to FIG. 1, the DC-DC converter includes a DC-DC controller 100 and an output stage 150.

In the present embodiment, the output stage 150 includes a high side switch 152, a low side switch 154, and an output inductor 156. In other embodiments, the output stage 150 may only include the high side switch 152 and the low side switch 154, and in this case, the output stage 150 provides a produced output voltage VOUT through an extra output inductor 156.

The DC-DC controller 100 includes a pulse width modulation (PWM) calculation circuit 110, a load transient detection circuit 130, and an override time calculation circuit 140. The load transient detection circuit 130 receives an input signal related to the output voltage VOUT of the output stage 150. The load transient detection circuit 130 provides a control signal TB according to the input signal and a predetermined input signal when a load transient event occurs. The predetermined input signal can be a triangle-wave signal, where the triangle-wave signal is also referred to as a ramp signal or a sawtooth signal.

The override time calculation circuit 140 is coupled to the load transient detection circuit 130 and the PWM calculation circuit 110, and provides an override control signal PW with a predetermined time to the PWM calculation circuit 110 according to the control signal TB and a time calculation mechanism.

Moreover, the DC-DC controller 100 further includes a feedback circuit 120. The feedback circuit 120 is coupled between an output of the output stage 150 and the PWM calculation circuit 110, and provides a feedback signal FB to the PWM calculation circuit 110 according to a ratio voltage of the output voltage VOUT.

In case of a normal load situation, the PWM calculation circuit 110 provides PWM signals W1 and W2 to the output stage 150 according to the feedback signal FB. When a load transient event occurs, the PWM calculation circuit 110 adjusts duty cycles of the PWM signals W1 and W2 according to the override control signal PW, so as to control the high side switch 152 and the low side switch 154 of the output stage 150.

The duty cycle refers to a ratio between a duration of a positive pulse representing 1 and a total pulse cycle in a bunch of ideal pulse sequence (for example, a square wave). Namely, the duration of the positive pulse representing 1 can be prolonged or shortened. When the load transient event occurs, the duration of the positive pulse representing 1 is prolonged, and the DC-DC controller 100 can quickly open the high side switch 152, so as to provide enough energy to the load. In this way, a desired value of the output voltage can be effectively adjusted.

Compositions and operation principles of related components are described below with reference of FIG. 1.

Figure 2A:
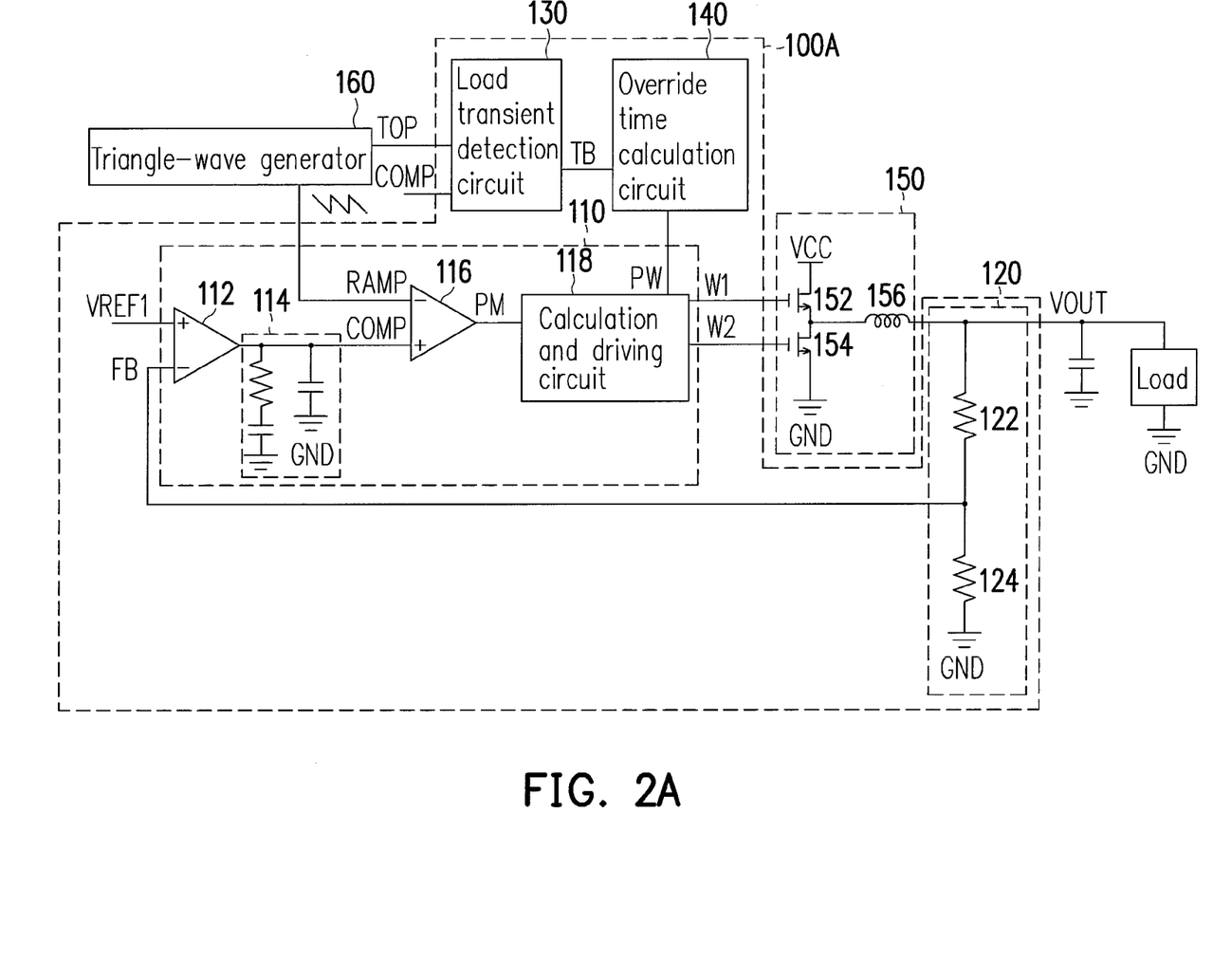
FIG. 2A is a circuit diagram of a DC-DC converter according to an embodiment of the invention.
Figure 2B:
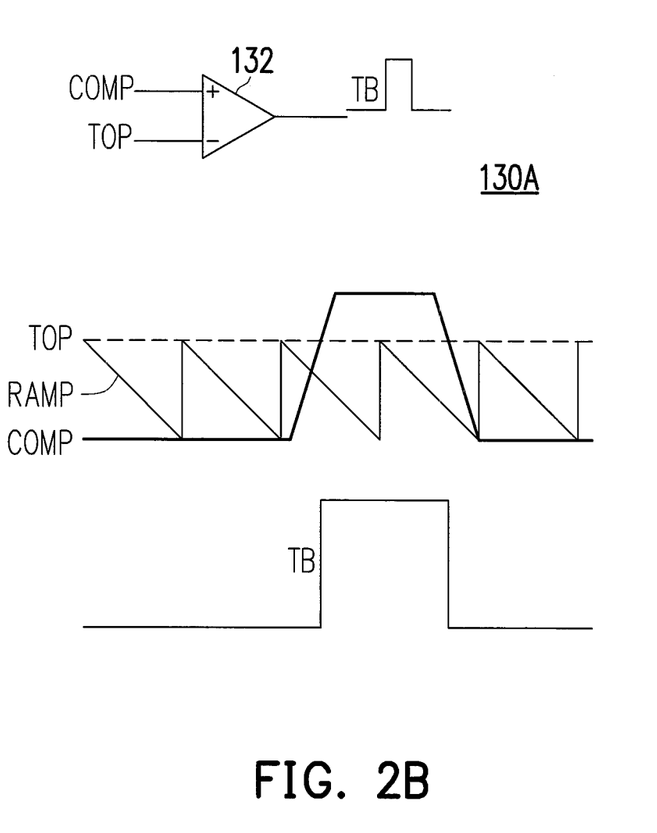
FIG. 2B is a timing diagram of a load transient detection circuit and related signals according to an embodiment of the invention.

FIG. 2A is a circuit diagram of a DC-DC converter according to an embodiment of the invention. FIG. 2B is a timing diagram of the load transient detection circuit and related signals according to an embodiment of the invention.

Referring to FIG. 2A and FIG. 2B, in the present embodiment, the DC-DC controller 100A is similar to the DC-DC controller 100. A load transient detection circuit 130A includes a comparator 132. A positive input terminal of the comparator 132 receives an error amplification signal COMP (the input signal), a negative input terminal of the comparator 132 receives a triangle-wave top value signal TOP (which is a top value of a waveform of the triangle-wave signal RAMP) from a triangle-wave generator 160, where the error amplification signal COMP is obtained by comparing the feedback signal FB and a reference voltage VREF1.

As shown in FIG. 2B, when the load transient event occurs, since the error amplification signal COM is greater than the triangle-wave top value signal TOP, the comparator 132 outputs the pulse-form control signal TB through an output terminal thereof.

Figure 3A:
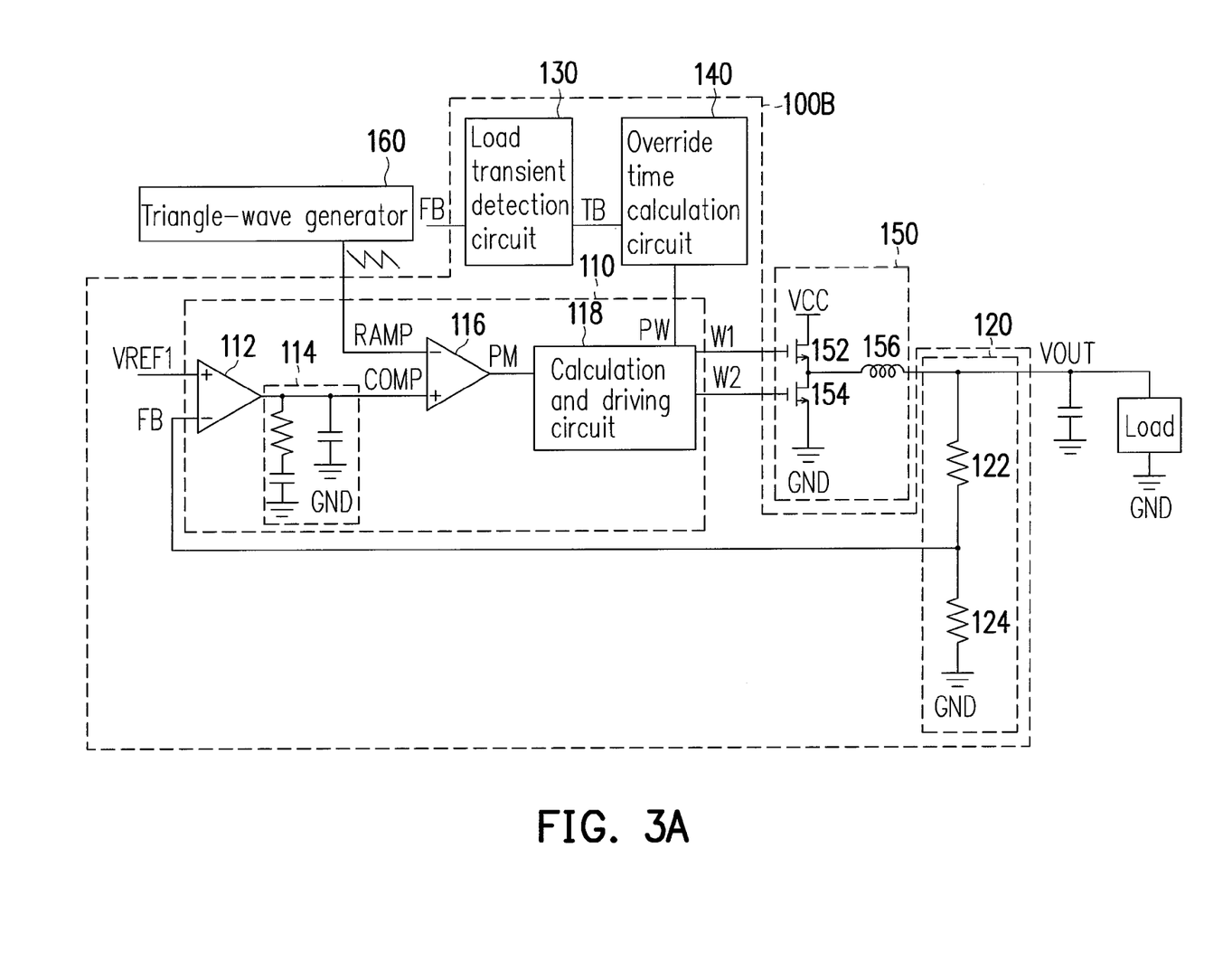
FIG. 3A is a circuit diagram of a DC-DC converter according to an embodiment of the invention.
Figure 3B:
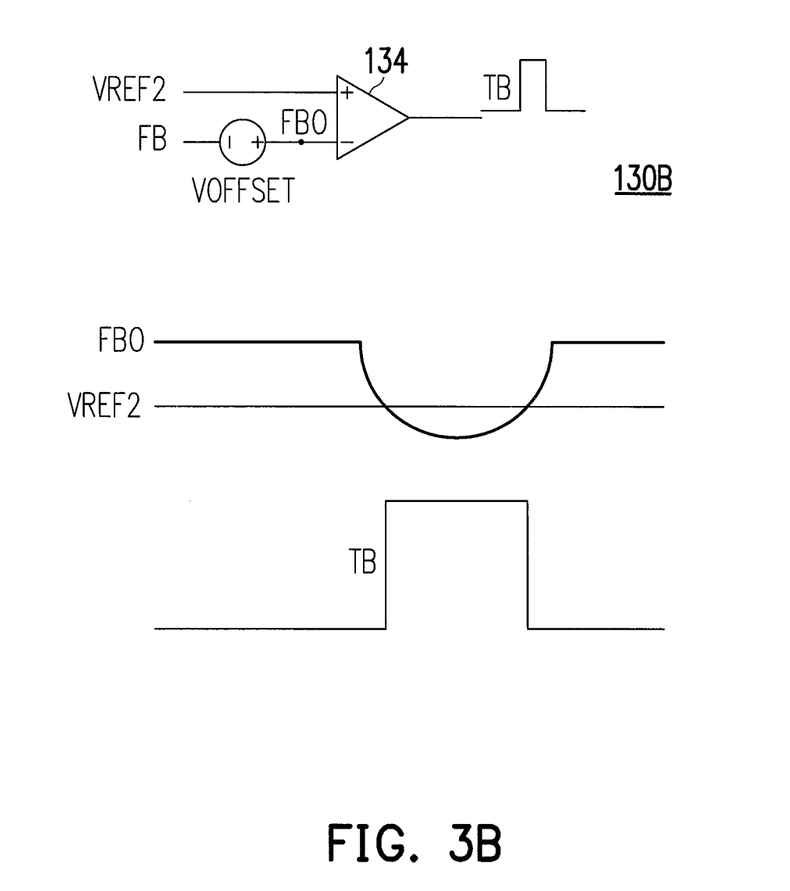
FIG. 3B is a timing diagram of a load transient detection circuit and related signals according to an embodiment of the invention.

FIG. 3A is a circuit diagram of a DC-DC converter according to an embodiment of the invention. FIG. 3B is a timing diagram of the load transient detection circuit and related signals according to an embodiment of the invention.

Referring to FIG. 3A and FIG. 3B, in the present embodiment, the DC-DC controller 100B is similar to the DC-DC controller 100. A load transient detection circuit 130B includes a comparator 134. A positive input terminal of the comparator 134 receives a predetermined reference voltage VREF2 (the predetermined input signal), and a negative input terminal of the comparator 134 receives a sum signal FBO of the feedback signal FB (the input signal) and an offset voltage VOFFSET.

The predetermined reference voltage VREF2 can be set to a potential the same to that of the feedback signal FB. When the load transient event occurs, since the sum signal FBO is lower than the predetermined reference voltage VREF2, the comparator 134 outputs the pulse-form control signal TB through an output terminal thereof.

Figure 4A:
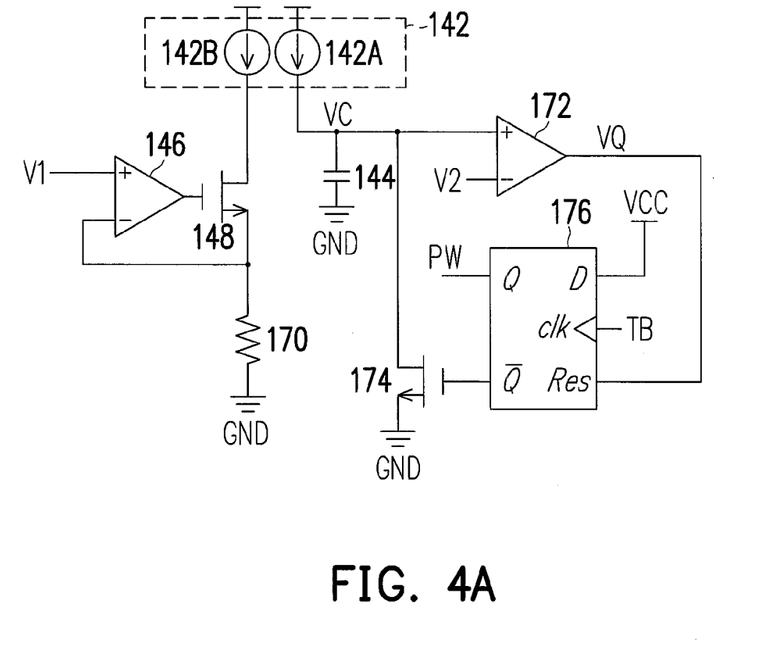
FIG. 4A is a circuit diagram of an override time calculation circuit according to an embodiment of the invention.
Figure 4B:
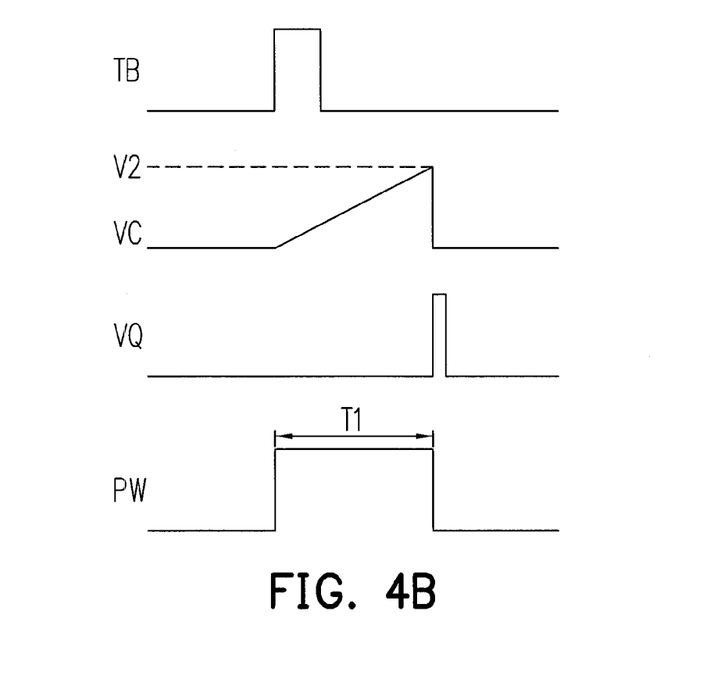
FIG. 4B is a timing diagram of an override time calculation circuit according to an embodiment of the invention.

FIG. 4A is a circuit diagram of an override time calculation circuit according to an embodiment of the invention. FIG. 4B is a timing diagram of the override time calculation circuit according to an embodiment of the invention.

Referring to FIG. 4A and FIG. 4B, the override time calculation circuit 140 includes a current source 142A, a current source 142B, a capacitor 144, a comparator 146, a transistor 148, a resistor 170, a comparator 172, a transistor 174 and a flip-flop 176.

The current sources 142A and 142B form a current mirror 142. The comparator 144 is coupled between an output of the current source 142A and a ground voltage terminal GND. A positive input terminal of the comparator 146 receives a reference voltage V1. A control terminal of the transistor 148 is coupled to an output terminal of the comparator 146, and a first terminal of the transistor 148 is coupled to an output of the current source 142B.

One end of the resistor 170 is coupled to a negative input terminal of the comparator 146 and a second terminal of the transistor 148, and another end of the resistor 170 is coupled to the ground voltage terminal GND. A positive input terminal of the comparator 172 is coupled to the output of the current source 142A. A negative input terminal of the comparator 172 receives a reference voltage V2. A first terminal of the transistor 174 is coupled to the output of the current source 142A and the positive input terminal of the comparator 172, and a second terminal of the transistor 174 is coupled to the ground voltage terminal GND.

In the flip-flop 176, an input terminal D receives an operating voltage VCC, a clock input terminal clk receives the control signal TB, a reset terminal Res is coupled to an output terminal of the comparator 172, an output terminal Q outputs the override control signal PW, and an output terminal $\overline{Q}$ is coupled to a control terminal of the transistor 174. It should be noticed that, a D-type flip-flop is used in the present embodiment, though the type of the flip-flop is not limited by the invention.

When the control signal TB is provided to the override time calculation circuit 140, the current source 142A starts charging the capacitor 144. When a signal VC on the capacitor 144 reaches the reference voltage V2, the capacitor 172 outputs a signal VQ, where the signal VQ has a logic high level, and the signal VC is pulled to a logic low level. A period (T1) when the generated override control signal PW is maintained to the logic high level is from a pulse rising edge of the control signal TB to a pulse rising edge of the signal VQ, i.e. the override control signal PW has the predetermined time T1.

It should be noticed that various parameters such as the reference voltage V1, the reference voltage V2, a resistance of the resistor 170 and a capacitance of the capacitor 144, etc. of the override time calculation circuit 140 can be adjusted, and each parameter can be adjusted according to a system application. Namely, a pulse width of the override control signal PW can be adjusted through various parameters, which is not limited to a specific parameter.

On the other hand, the override control signal PW can be used to control the output stage 150 of FIG. 1, and is flexible in adjusting the duty cycles of the pulse widths of the PWM signals W1 and W2 of FIG. 1, so as to prolong or shorten a duration of the positive pulse representing 1. Therefore, in the present embodiment of the invention, the override control signal PW with longer or shorter duration compared to that of the control signal TB can be generated.

Referring to FIG. 1, the PWM calculation circuit 110 includes a comparator 112, a compensation unit 114, a comparator 116 and a calculation and driving circuit 118. In the comparator 112, a positive input terminal receives the reference voltage VREF1, and a negative input terminal receives the feedback signal FB. The compensation unit 114 is composed of resistors and capacitors.

The compensation unit 114 is coupled to an output terminal of the comparator 112 and the ground voltage terminal GND. The compensation unit 114 is used to compensate the error amplification signal COMP. A positive input terminal of the comparator 116 receives the triangle-wave signal RAMP form the triangle-wave generator 160, and a negative input terminal of the comparator 160 is coupled to an output terminal of the comparator 112 and the compensation unit 114.

The calculation and driving circuit 118 is coupled to an output terminal of the comparator 116, and receives the override control signal PW. The calculation and driving circuit 118 outputs the PWM signals W1 and W2 to the output stage 150 according to a signal PM and the override control signal PW.

Moreover, the calculation and driving circuit 118 may have an OR gate circuit. In the normal load situation, the PWM signals W1 and W2 are provided according to the signal PM, and when the load transient event occurs, the OR gate circuit is used to open the high side switch 152 by using the override control signal PW.

Figure 5A:
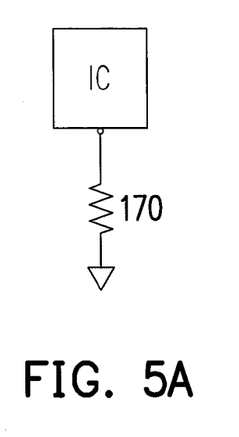
FIG. 5A and FIG. 5B are integrated circuit (IC) schematic diagrams according to an embodiment of the invention.
Figure 5B:
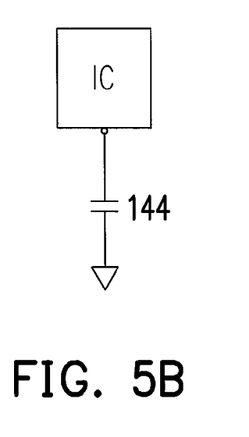

FIG. 5A and FIG. 5B are integrated circuit (IC) schematic diagrams according to an embodiment of the invention. In the present embodiment, most of the components of the DC-DC controller 100 can be configured in an IC, and the resistor 170 or the capacitor 144 in the override time calculation circuit 140 can be designed as an adjustable component and configured at external of the IC, so as to facilitate adjusting the adjustable parameter.

It should be noticed that the resistor 170 or the capacitor 144 is a part of the override time calculation circuit 140 of FIG. 4A.

According to the above descriptions, an operation method of the DC-DC controller can be deduced below. In detail, FIG. 6 is a flowchart illustrating an operation method of the DC-DC controller according to an embodiment of the invention.

Figure 6:
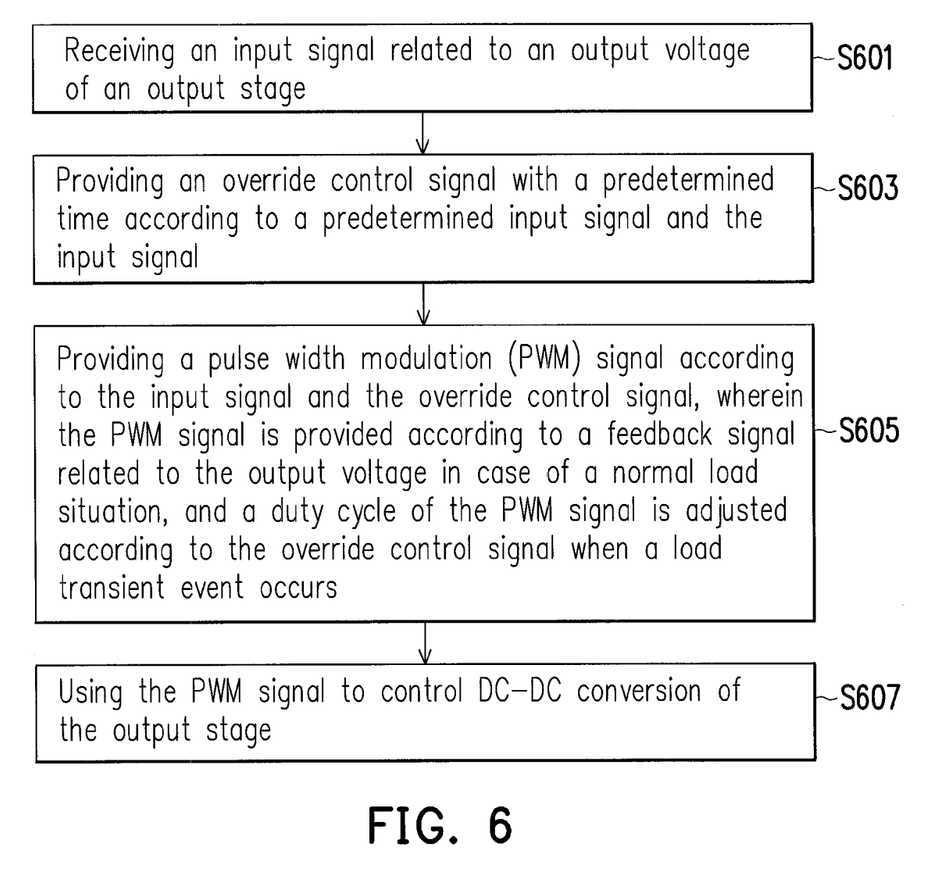
FIG. 6 is a flowchart illustrating an operation method of a DC-DC controller according to an embodiment of the invention.

Referring to FIG. 1, FIG. 4B and FIG. 6, the operation method of the DC-DC controller of the present embodiment includes following steps.

In step S601, an input signal related to the output voltage VOUT of the output stage 150 is received.

In step S603, the override control signal PW with the predetermined time T1 is provided according to a predetermined input signal and the input signal.

Then, in step S605, the PWM signals W1 and W2 are provided according to the input signal and the override control signal PW, where the PWM signals W1 and W2 are provided according to the feedback signal FB related to the output voltage VOUT in case of the normal load situation, and duty cycles of the PWM signals W1 and W2 are adjusted according to the override control signal PW when the load transient event occurs.

Then, in step S607, the PWM signals W1 and W2 are used to control DC-DC conversion of the output stage 150, so as to adjust a desired value of the output voltage.

Moreover, in the operation method of the DC-DC controller, when the input signal is the error amplification signal COMP, the predetermined input signal is the triangle-wave top value signal TOP (referring to FIG. 2B). On the other hand, in the operation method of the DC-DC controller, when the input signal is related to the feedback signal FB, the predetermined input signal is the predetermined reference voltage VREF2 (referring to FIG. 3B).

In summary, the DC-DC controller of the invention can provide a flexible override control signal, so that in case of a normal load situation, the PWM signal is provided according to the feedback signal, and when the load transient event occurs, the duty cycles of the PWM signals are adjusted according to the override control signal, by which a desired value of the output voltage is effectively adjusted, which avails improving performance of the DC-DC controller.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC)-DC controller, configured to connect with an output stage, and the DC-DC controller comprising:
    a pulse width modulation (PWM) calculation circuit, providing a PWM signal to the output stage;
    a load transient detection circuit, receiving an input signal related to an output voltage of the output stage, and providing a control signal according to the input signal and a predetermined input signal; and
    an override time calculation circuit, coupled to the load transient detection circuit and the PWM calculation circuit, and providing an override control signal with a predetermined time to the PWM calculation circuit according to the control signal,
    wherein the PWM calculation circuit adjusts a duty cycle of the PWM signal according to the override control signal.

2. The DC-DC controller as claimed in claim 1, wherein when the input signal received by the load transient detection circuit is an error amplification signal, the predetermined input signal is a triangle-wave signal.

3. The DC-DC controller as claimed in claim 1, wherein when the input signal is a feedback signal of the output stage, the predetermined input signal is a predetermined reference voltage.

4. The DC-DC controller as claimed in claim 1, wherein the load transient detection circuit comprises:
    a first comparator, having a first input terminal, a second input terminal and a first output terminal, wherein the first input terminal receives an error amplification signal, the second input terminal receives a triangle-wave top value signal, and the first output terminal outputs the control signal.

5. The DC-DC controller as claimed in claim 1, wherein the load transient detection circuit comprises:
    a second comparator, having a third input terminal, a fourth input terminal and a second output terminal, wherein the third input terminal receives a predetermined reference voltage, the fourth input terminal receives a sum signal of the input signal and an offset voltage, and the second output terminal outputs the control signal.

6. The DC-DC controller as claimed in claim 1, wherein the override time calculation circuit comprises:
    a first current source; and
    a capacitor, coupled between an output of the first current source and a ground voltage terminal.

7. The DC-DC controller as claimed in claim 6, wherein the override time calculation circuit further comprises:
    a second current source, the second current source and the first current source forming a current mirror;
    a third comparator, having a fifth input terminal, a sixth input terminal and a third output terminal, wherein the fifth input terminal receives a first reference voltage;
    a first transistor, having a control terminal coupled to the third output terminal, and a first terminal coupled to an output of the second current source; and
    a first resistor, having one end coupled to the sixth input terminal and a second terminal of the first transistor, and another end coupled to the ground voltage terminal.

8. The DC-DC controller as claimed in claim 6, wherein the override time calculation circuit further comprises:
    a fourth comparator, having a seventh input terminal, an eighth input terminal and a fourth output terminal, wherein the seventh input terminal is coupled to an output of the first current source, and the eighth input terminal receives a second reference voltage;
    a second transistor, having a first terminal coupled to the output of the first current source and the seventh input terminal, and a second terminal coupled to the ground voltage terminal; and
    a flip-flop, having a ninth input terminal, a clock input terminal, a reset terminal, a fifth output terminal and a sixth output terminal, wherein an output of the fifth output terminal and an output of the sixth output terminal are inverted to each other, the ninth input terminal receives an operating voltage, the clock input terminal receives the control signal, the reset terminal is coupled to the fourth output terminal, the fifth output terminal outputs the override control signal, and the sixth output terminal is coupled to a control terminal of the second transistor.

9. The DC-DC controller as claimed in claim 1, wherein the PWM calculation circuit comprises:
    a fifth comparator, having a tenth input terminal, an eleventh input terminal and a seventh output terminal, wherein the tenth input terminal receives a third reference voltage, and the eleventh input terminal receives the feedback signal;
    a compensation unit, coupled to the seventh output terminal and the ground voltage terminal;
    a sixth comparator, having a twelfth input terminal, a thirteenth input terminal and an eighth output terminal, wherein the twelfth input terminal receives a triangle-wave signal, and the thirteenth input terminal is coupled to the seventh output terminal and the compensation unit; and a calculation and driving circuit, coupled to the eighth output terminal, and receiving the control signal to output the PWM signal to the output stage.

10. An operation method of a direct current (DC)-DC controller, comprising:

receiving an input signal related to an output voltage of an output stage;

providing an override control signal with a predetermined time according to a predetermined input signal and the input signal;

providing a pulse width modulation (PWM) signal according to the input signal and the override control signal, wherein the PWM signal is provided according to a feedback signal related to the output voltage in case of a normal load situation, and a duty cycle of the PWM signal is adjusted according to the override control signal when a load transient event occurs; and using the PWM signal to control DC-DC conversion of the output stage.

11. The operation method of the DC-DC controller as claimed in claim 10, wherein when the input signal is an error amplification signal, the predetermined input signal is a triangle-wave top value signal.

12. The operation method of the DC-DC controller as claimed in claim 10, wherein when the input signal is related to the feedback signal, the predetermined input signal is a predetermined reference voltage.

* * * * *